United States Patent
Rossle

Patent Number: 5,862,781
Date of Patent: Jan. 26, 1999

[54] TWO-STROKE INTERNAL COMBUSTION ENGINE

[76] Inventor: Gottfried Rossle, Geisnangstrasse 3, D-71640 Ludwigsburg, Germany

[21] Appl. No.: 860,429
[22] PCT Filed: Dec. 16, 1995
[86] PCT No.: PCT/DE95/01806
§ 371 Date: Jun. 25, 1997
§ 102(e) Date: Jun. 25, 1997
[87] PCT Pub. No.: WO96/19651
PCT Pub. Date: Jun. 27, 1996

[30] Foreign Application Priority Data

Dec. 18, 1994 [DE] Germany .......................... 44 44 767.1

[51] Int. Cl.$^6$ .............................. F02B 33/12; F02B 33/44; F02B 75/32
[52] U.S. Cl. ...................... 123/55.7; 123/70 R; 123/74 D
[58] Field of Search .................................. 123/55.7, 70 R, 123/74 D, 65 V, 53.6, 54.1, 53.2, 74 R

[56] References Cited

U.S. PATENT DOCUMENTS

| | | | |
|---|---|---|---|
| 981,811 | 1/1911 | Steven | 123/55.7 |
| 1,719,514 | 7/1929 | Loud . | |
| 2,247,299 | 6/1941 | Klavik | 123/55.7 |
| 2,290,202 | 7/1942 | Nelson . | |
| 2,559,484 | 7/1951 | Waring | 123/70 R |
| 3,377,997 | 4/1968 | Combs . | |
| 4,211,082 | 7/1980 | Bristol | 123/70 R |
| 5,123,334 | 6/1992 | Van Loo | 123/55.7 |
| 5,331,926 | 7/1994 | Vaux et al. . | |

FOREIGN PATENT DOCUMENTS

| | | |
|---|---|---|
| 116188 | 2/1899 | Germany . |
| 409919 | 2/1925 | Germany . |
| 1104257 | 4/1961 | Germany . |
| 3025724 | 2/1982 | Germany . |
| 4140627 | 7/1992 | Germany . |

Primary Examiner—Marguerite McMahon
Attorney, Agent, or Firm—Paul Vincent

[57] ABSTRACT

In a two-stroke internal combustion engine with a crank slide mechanism and a plurality of working cylinders which, have bases and are divided by a piston into a lower and an upper cylinder chamber, the lower cylinder chamber being used substantially for compression and the upper cylinder chamber being used substantially for combustion, storage cylinders are provided which can be connected to cavities such as working cylinders of the engine and processing chambers such that each adjoining cavity has at least one closable inlet opening through which an air-fuel mixture, e.g. can flow from the storage cylinder into the cavity and at least one closable outlet opening through which the mixture can flow out of the cavity into the storage chamber. The storage chamber is charged by the lower cylinder chambers with the air-fuel mixture and the mixture is fed as necessary to the upper cylinder chambers for combustion or the mixture is conveyed out of the lower cylinder chambers into given compartments of the storage cylinder and from there is fed to the processing chambers for processing. After processing, the mixture is fed back to given compartments of the storage cylinder and then fed to the upper cylinder chambers for combustion. The storage cylinder enables circulation losses to be avoided since the air-fuel mixture is not introduced at bottom dead center of the pistons, rather during the compression stroke, e.g. when the outlet slot is closed.

17 Claims, 2 Drawing Sheets

TWO-STROKE INTERNAL COMBUSTION ENGINE

BACKGROUND OF THE INVENTION

The invention concerns a two-stroke internal combustion engine comprising a number of working cylinders having bases and subdivided via their pistons into a lower and an upper cylinder chamber, wherein the lower cylinder chamber functions substantially for compression and the upper cylinder chamber substantially for compression and combustion.

A two-stroke motor of this type has been proposed by the inventor Gottfried Hillekum and has become known in the art from German Patent No. 409919 of Feb. 16, 1925 entitled "Two-stroke Internal Combustion Engine with Two Oppositely Lying Cylinders".

Disadvantageously, this crank slide two-stroke internal combustion engine circulates the exhaust out of the working cylinder using a fresh fuel-air mixture (fresh gas) when the piston moves through its bottom dead center position. Since, at this point of time, operation of the engine requires inlet and outlet openings to be simultaneously opened, a portion of the fresh gas unavoidably is circulated along with the exhaust. These circulation losses lead to increased fuel consumption, to high carbon monoxide and hydrocarbon concentrations in the exhaust gas, to increased particle formation, to charring and to wear.

It is therefore the underlying purpose of the present invention to further improve the conventional motor in such a fashion that its disadvantages are avoided.

SUMMARY OF THE INVENTION

In a first solution in accordance with the invention, the circulation losses are avoided in that no circulation is performed. At the point in time at which the piston moves approximately in its bottom dead center position, the exhaust gas flows out through the outlet opening. At high temperatures, the mass of exhaust gas which remains after closing the outlet opening is small. Fresh gas subsequently brought in during the compression stroke mixes with the remaining exhaust gas. Elimination of the circulation step leads to a well-dosed mixture of exhaust gas which lowers nitrogen oxide emissions.

In a second solution in accordance with the invention, the circulation losses are avoided in that circulation uses pure fresh air from an auxiliary compressor (e.g. an exhaust turbo compressor). At the point in time at which the piston moves at approximately its bottom dead center position, the exhaust gas is forced through the outlet opening. The remaining circulation air, together with the fresh gas subsequently introduced during the compression stroke, lead to a doubled reactive gas mass so that approximately twice the power can be expected. Even higher power levels can be achieved if the auxiliary machine can be used as a charger. Utilization of the auxiliary machine as a circulator and charger leads to better distribution of the auxiliary machine load so that even engines having a low number of cylinders can profit from the advantages of an auxiliary compressor.

The purpose in accordance with the invention is achieved with a plurality of novel construction and method features.

During the circulation process, conventional two-stroke engines must bring the fresh gas into the working cylinder at the bottom dead center position of the piston within an amount of time which is in general much too short. In contrast thereto, the motor in accordance with the invention has the entire compression stroke. In this manner, circulation losses are reduced to a minimum.

Charging during compression can, however, not be carried out by the lower cylinder chamber of the working cylinder, since the lower cylinder chamber is in a state of expansion. A prominent feature of the invention consists in having the lower cylinder chambers of other working cylinders contribute to each charging of an upper cylinder chamber. In principle, a working cylinder contributing to charging can be disposed at an opposite or adjacent position.

The engine in accordance with the invention is principally distinguished in that at least one storage cylinder is provided for to which at least two working cylinders are attached in such a fashion that at least one inlet opening is provided for each attached working cylinder through which a stream of fresh gas can flow from the storage cylinder into the cavity and each with at least one outlet opening through which a stream of fresh gas can flow out of the cavity into the storage cylinder.

The storage cylinder is preferentially fashioned as a hollow cylinder whose longitudinal axis is parallel to the longitudinal axis of the attached working cylinders and which is occupied by a fresh gas sliding valve in the form of a hollow cylinder borne in the storage cylinder in a displaceable fashion.

In this advantageous embodiment, the fresh gas sliding valve has openings corresponding to the inlet and outlet openings of the storage cylinder and the openings in the fresh gas sliding valve can be displaced over the openings in the storage cylinder in such a fashion that the openings in the storage cylinder can be opened and closed via the fresh gas sliding valve so that fresh gas can flow out of the lower cylinder chamber into the cavity of the fresh gas sliding valve or fresh gas can flow out of the cavity of the fresh gas sliding valve into the upper cylinder chamber.

The fresh gas sliding valve is, in this advantageous embodiment, closed at its ends via lids.

The cavity of the fresh gas sliding valve can be subdivided with walls. These walls are necessary in the event that the fresh gas stored in the storage cylinder is to be processed, with the processed gas not being allowed to come into contact with the unprocessed gas. In this case, the storage cylinder must have at least one inlet opening and at least one outlet opening connected to the processing chamber. Likewise the fresh gas sliding valve must have additional corresponding openings.

In order to execute processing, the fresh gas is fed into a compartment in the fresh gas sliding valve and passed from this location into a processing chamber or into a plurality of sequentially stacked processing chambers and, subsequent to processing, fed back to a compartment in the storage cylinder and introduced to the upper cylinder chamber.

It is advantageous in accordance with the invention to incorporate all technically possible and reasonable processing and improvements to the fresh gas stored in the storage cylinder in differing possible processing chambers. One can provide that:

the processing chamber is a heat exchanger, e.g. an intermediate charging air cooler by means of which heat can be extracted from the system, the processing chamber is a heat exchanger by means of which heat can be fed to the system, e.g. exhaust heat from processes, or heat from a connected burner for sole hot air engine operation or combined hot air and combustion engine operation, the processing chamber facilitates production of an emulsion fuel through the addition of water or steam and through the addition of an emulsifying agent, the processing chamber has a filter, the processing chamber has a catalytic converter, the processing chamber is a reactor with the assistance of which and with the addition of reactive materials, an improvement in the quality of the exhaust or a reduction in the emission of pollutants is effected, the processing chamber facilitates a combination of the above-mentioned possibilities or effects processing not mentioned herein.

In an advantageous embodiment of the invention, movement of the fresh gas sliding valve is coupled to motion of the pistons and driven directly or indirectly by means of a crank shaft cam.

It is also possible for the fresh gas sliding valve to be configured in such a fashion that the separation from the crank shaft is adjustable so that the opening and closing of the storage chamber openings can be displaced relative to the motion of the piston.

Various constructive features should be mentioned with regard to the number of working cylinders:

In an embodiment having two working cylinders, the pneumatic cooperation takes place between oppositely lying working cylinders. In order to be able to guide the fresh gas from one working cylinder to the oppositely lying working cylinder, the cavity of the fresh gas sliding valve must traverse the crank case. This is possible when the crank shaft is disposed in a sidewardly displaced fashion and if the device for connecting the piston rods and the fresh gas sliding valve to the crank shaft is sidewardly disposed.

In an embodiment having an number of working cylinders which is a multiple of four, the pneumatic cooperation preferentially occurs between two neighbouring working cylinders whose input and output openings are connected to the storage cylinder. Two oppositely lying fresh gas sliding valves can be unified into a fresh gas sliding valve unit. In this fashion, one crank shaft cam can operate four working cylinders.

An embodiment of the invention provides that, in addition to the openings for the storage cylinder, the working cylinders have openings for fresh air or for fresh gas input channels and for circulating air and outlet channels for exhaust gas, which can be closed via additional control valves with these control valves being directly or indirectly driven by a cam on the crank shaft. In this fashion one guarantees that all control functions on the motor are performed via the crank shaft, same being, in any event, necessary for power transmission.

The circulation air inlet openings can be closed along with the exhaust gas opening via a common control valve (circulation air exhaust gas sliding valve). In this fashion only one sliding valve is required for the circulation air inlet and the exhaust gas outlet.

One part of the circulation air channel can be eliminated in the event that the cavity in which the sliding valve moves, forms a part of the circulation air channel.

In addition, openings are provided for equilibration of pressure differences between the circulation air channel and the working cylinder.

Additional advantages can be derived from the description of the accompanying drawing. The above mentioned features and those described below can be utilized in accordance with the invention individually or collectively in arbitrary combination. The embodiments shown are not to be considered as exhaustive enumeration, rather have exemplary character.

An embodiment of the invention is represented in the drawing and will be more closely described below. This embodiment concerns a four cylinder engine which is partially shown in a highly schematic fashion and is not to be taken to scale.

DESCRIPTION OF THE PREFERRED EMBODIMENT

Figure 1:
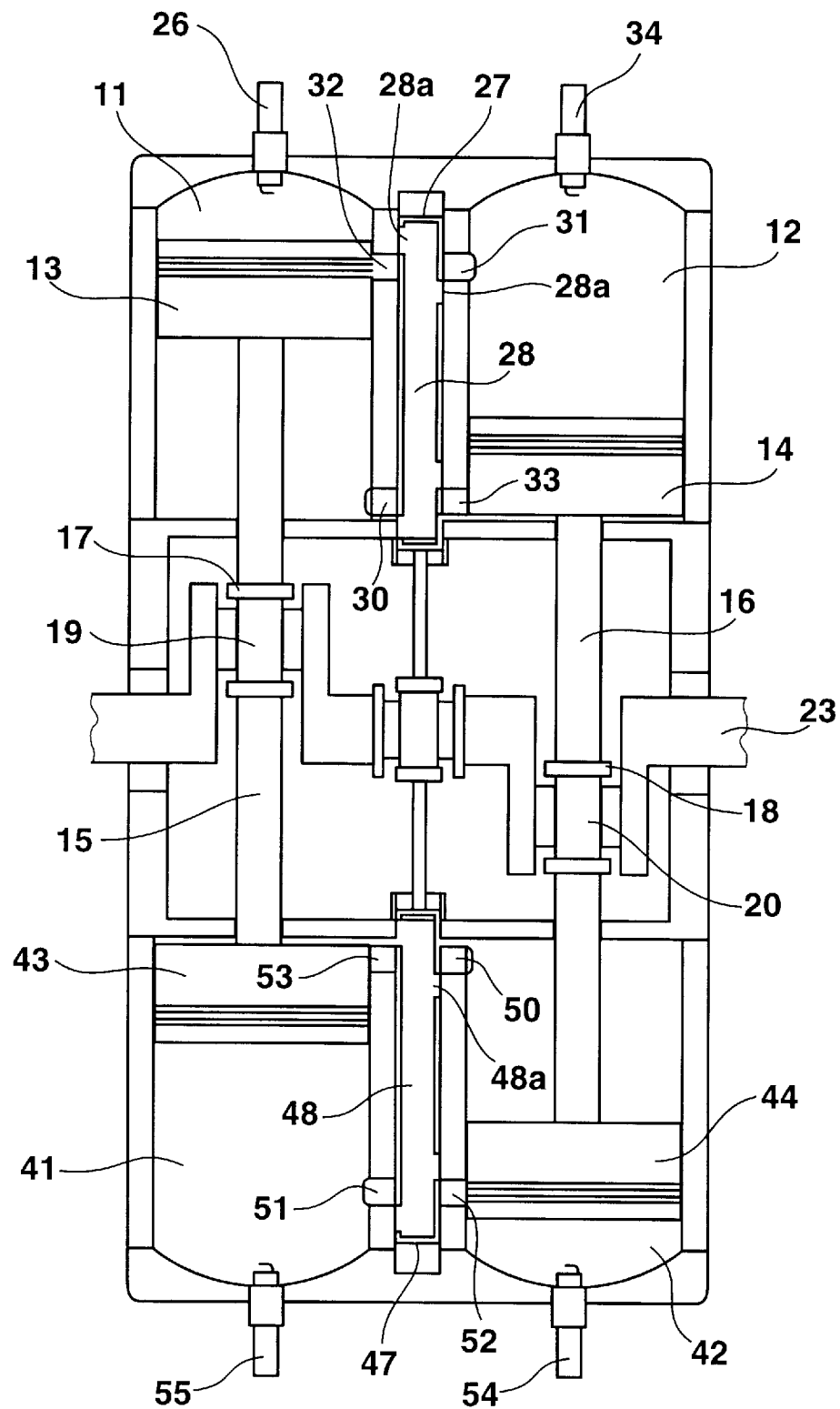
FIG. 1 shows a plan view of an exemplary embodiment of the internal combustion engine in accordance with the invention.

As seen in FIG. 1, working cylinders 11 and 12 are disposed in a cylinder housing, within which pistons 13 and 14 can be moved back and forth. The pistons 13 and 14 are connected to crank links 17 and 18 by means of piston rods 15 and 16. Link blocks 19 and 20 are disposed in a movable fashion in the crank links 17 and 18 and can be driven by means of the pistons 13 and 14 and the crank links 17 and 18. The link blocks 19 and 20 direct the force onto crank pins (not shown) of the crank shaft 23. A mechanical configuration of this type is e.g. realized in the Hellekum motor (inventor Gottfried Hellekum).

During the first bottom dead center position of pistons 13 and 14, the fresh gas sliding valve 27 assumes a middle position. In this location openings 30, 31, 32 and 33 of the storage chamber 28 are sealed by the fresh gas sliding valve 27. After ignition of the spark plug 26, the piston 13 proceeds through the first half-stroke in the downward direction and the piston 14 through its first half-stroke in the upper direction. The fresh gas sliding valve 27 moves by a half stroke in the upper direction to open the inlet opening 30 of the storage cavity 28. In this fashion the air fuel mixture contained in the lower cylinder chamber of the working cylinder 11 can escape into the storage chamber 28.

The role of the chamber in a two stroke engine in accordance with the invention is thereby simplified in that as many working cylinders are connected which operate in the same sense as working cylinders operating in an opposing sense. In this manner the volume introduced from connected working cylinders operating in the same sense is approximately the same as the volume removed from those working in an opposite sense. In this fashion pressure variations in the storage unit are avoided. The working cylinder 12 belongs to the group of working cylinders operating in an opposing sense relative to the working cylinder 11.

The working cylinder 12 now requires input of air-fuel mixture into its upper cylinder chamber. This requirement is satisfied by the storage chamber 28. Motion of the fresh gas sliding valve 27 by a half a stroke in the upper direction causes the outlet opening 31 of the storage chamber 28 to also open so that the air-fuel mixture can flow out of the storage unit 28 into the upper cylinder chamber of the working cylinder 12. During the time in which the piston exercises its second stroke half, the fresh gas sliding valve 27 moves downwards by a half a stroke back into its intermediate position.

In the second dead center location of the pistons 13 and 14, the openings 30, 31, 32, 33 of the storage chamber 28 are sealed by the fresh gas sliding valve 27. After ignition of the spark plug 34, the piston 14 exercises the first half stroke in the downward direction and the piston 13 the first half stroke in the upper direction. The fresh gas sliding valve 27 moves by a half stroke in the downward direction and opens the inlet opening 33 of the storage chamber 28. In this manner the air fuel mixture contained in the lower cylinder chamber of working cylinder 12 can escape into the storage chamber 28.

At this point the working cylinder 11 requires air-fuel mixture input into its upper cylinder chamber. This requirement is satisfied by the storage chamber 28. By means of the motion of the fresh gas sliding valve 27 by half of a stroke in the downward direction, the outlet opening 32 of the storage chamber 28 is also opened so that the air-fuel mixture can flow out of the storage unit 28 into the upper cylinder chamber of the working cylinder 11.

During the time at which the piston exercises its second stroke half, the fresh gas sliding valve 27 moves back by a half a stroke in the upward direction into its middle position to thereby close the inlet opening 33 and the outlet opening 32 of the storage chamber 28. At this point the initial position is regained.

The working cylinders 11 and 12, having spark plugs 26 and 34, are disposed directly opposite to working cylinders 41 and 42. Pistons 43 and 44 of working cylinders 41 and 42 are connected to crank links 17 and 18 via common piston rods 15 and 16. Motion of the piston 43 is thereby coupled to motion of the piston 13, whereas the motion of the piston 44 is coupled to the motion of the piston 14. The storage chamber 48, having the fresh gas sliding valve 47 and openings 51, 52, 53 and 50, is located across from the storage chamber 28 having the fresh gas sliding valve 27 and the openings 30, 31, 32 and 33. Motion of the fresh gas sliding valve 47 is coupled to motion of the fresh gas sliding valve 27.

Figure 2:
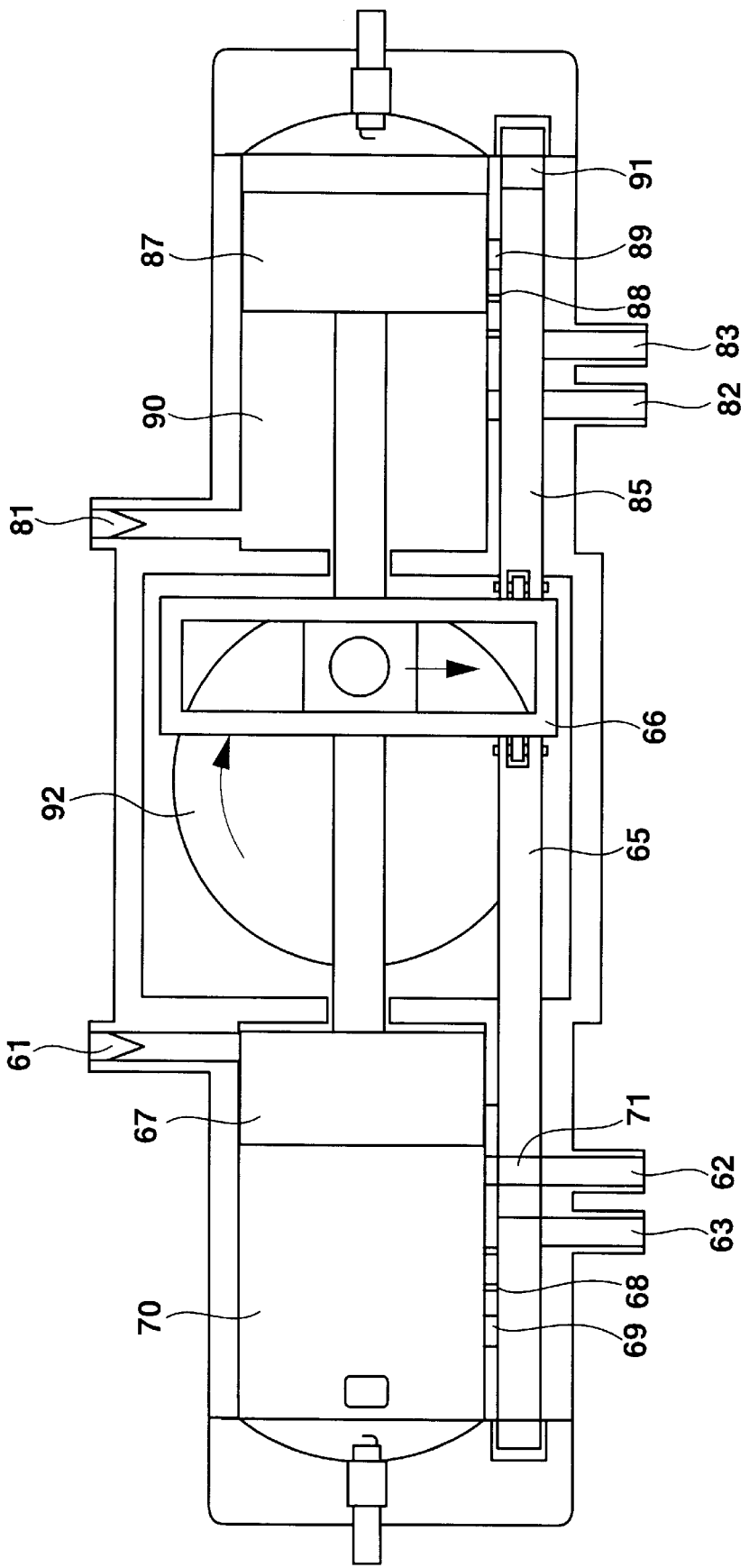
FIG. 2 shows a cross-section through an exemplary embodiment of the internal combustion engine in accordance with the invention.

As seen in FIG. 2, in working cylinders 60 and 90, the fresh air inlet channels 61 and 81 are controlled by suction valves and the exhaust outlet channels 62 and 82 as well as the circulation air inlet channels 63 and 83 are controlled by the fresh air exhaust sliding valves 65 and 85 which are connected to crank link 66. The connection to the crank link couples the circulation air exhaust gas sliding valves 65 and 85 to the motion of the pistons 67 and 87 and thereby to motion of the crank shaft 92. A free end of the exhaust gas-fresh air sliding valves 65 and 85 opens and closes the circulation air inlet channels 63 and 83. The channel through holes 71 and 91 of the circulation air exhaust gas sliding valves 65 and 85 overlap with the exhaust gas outlet channels 62 and 82 so that the exhaust gas can escape together with the blown in circulation air approximately at the bottom dead center position of the pistons 67 and 68. Through holes 68 and 88 provide for reduction of high pressure of the trapped exhaust gas in the channel through holes 71 and 91 after passage through openings 68 and 89 during motion of the circulation air exhaust gas sliding valves 65 and 85 in the downward direction.

I claim:

1. A two-stroke internal combustion engine comprising pairs of cylinders aligned opposite to each other separated by a crank case, each pair of cylinders having a common piston rod to transmit a power output of said engine, the engine comprising:

a crank shaft disposed in the crank case;

a first cylinder having a head at one end and a base at an opposite end, said base having a hole, said first cylinder also having a first piston subdividing said first cylinder into an upper chamber adjacent to said head and lower chamber adjacent to said base, said lower chamber for charging during an upward motion of said piston and for compression during a downward motion of said first piston, said upper chamber for compression during an upward motion of said first piston and for power production during a downward motion of said first piston, said first cylinder also having a first piston rod passing through said hole in said base, connected between said first piston and said crank shaft, and disposed largely transverse to said crank shaft for rotating said crank shaft during a downward motion of said first piston, said first cylinder having an inlet opening proximate to said head and an outlet opening proximate to said base;

a second cylinder having a head at one end and a base at an opposite end, said base having a hole and also having a second piston subdividing said second cylinder into an upper chamber adjacent to said head and a lower chamber adjacent to said base, said lower chamber for charging during an upward motion of said second piston and for compression during a downward motion of said second piston, said upper chamber for compression during an upward motion of said second piston and for power production during a downward motion of said second piston, said second cylinder also having a second piston rod passing through said hole in said base, connected between said second piston and said crank shaft and disposed largely transverse to said crank shaft for rotating said crank shaft during a downward motion of said second piston, said second cylinder having an inlet opening proximate to said head and an outlet opening proximate to said base, wherein said second piston is proximate to said base of said second cylinder when said first piston is proximate to said head of said first cylinder and wherein said second piston is proximate to said head of said second cylinder when said first piston is proximate to said base of said first cylinder; and a storage chamber parallel to and connected between said first and said second cylinders, said storage chamber having a sliding valve displaceable in a direction parallel to a longitudinal axis of said first and said second cylinders inside said storage chamber, said sliding valve having openings communicating with said inlet and outlet openings in said first and said second cylinders to connect said upper and said lower chambers of said first and said second cylinders to said storage chamber.

2. The engine of claim 1, wherein said storage chamber is subdivided into a plurality of stacked storage chambers.

3. The engine of claim 1, wherein said sliding valve is closed at its ends.

4. The engine of claim 1, wherein said sliding valve has a cavity divided by walls.

5. The engine of claim 1, further comprising means for coupling a motion of said sliding valve to a motion of said first and said second pistons.

6. The engine of claim 5, further comprising means for coupling a motion of said sliding valve to a motion of said crank shaft.

7. The engine of claim 6, wherein said means for coupling said sliding valve to said crank shaft is adjustable relative to a separation between said crank shaft and said sliding valve.

8. The engine of claim 1, wherein said first cylinder is aligned opposite to said second cylinder and said first and second cylinders are separated by the crank case and said sliding valve traverses said crank case, said sliding valve having an undivided cavity.

9. The engine of claim 6, further comprising a second sliding valve connected to said first sliding valve to form a sliding valve unit driven by said crank shaft.

10. The engine of claim 1, wherein said openings in said sliding valve and a displacement of said sliding valve first open and then close said outlet opening of said first cylinder together with said inlet opening of said second cylinder to push compressed gas out of the said first cylinder into a cavity of said sliding valve and then into said second working cylinder, and thereafter first open and then close said outlet opening of said second working cylinder together with said inlet opening of said first working cylinder to push compressed gas out of said second cylinder into said cavity of said control valve and then into said first cylinder.

11. The engine of claim 1, wherein said sliding valve has a partition directed transverse to a longitudinal axis of said sliding valve to subdivide a cavity of said sliding valve for directing a flow of gas to a processing chamber disposed within a gas path between said first and said second cylinders.

12. The engine of claim 1, wherein said first and said second cylinders have additional inlet openings for at least one of fresh air, an air-fuel mixture, and circulation air and additional outlet channels for exhaust gas, said additional openings and said additional outlet channels sealed by additional sliding valves driven by said crank shaft.

13. The engine of claim 12, wherein said first and said second cylinders have an additional inlet opening for circulation air, and said circulation air inlet opening and said exhaust gas outlet channel for sealing by a common circulation air exhaust gas sliding valve.

14. The engine of claim 13, wherein said circulation air exhaust gas sliding valve has a cavity forming part of a circulation air channel.

15. The engine of claim 14, wherein said circulation air exhaust gas sliding valve cavity has openings for connection to said first and said second cylinders.

16. The engine of claim 1, further comprising an auxiliary compressor for circulation of said first and said second cylinder upper chambers and for charging said first and said second cylinder lower chambers.

17. The engine of claim 1, further comprising an additional engine chamber connectable to said storage chamber, wherein said storage chamber has an additional inlet opening through which gas can flow from said additional chamber into said storage chamber, and said storage chamber has an additional outlet opening through which gas can flow out of said storage chamber into said additional chamber.

* * * * *